United States Patent
Doidic et al.

(10) Patent No.: US 11,037,353 B2
(45) Date of Patent: Jun. 15, 2021

(54) SIMULATED DYNAMIC WATER SURFACE FOR MODEL SCENERY

(71) Applicants: Michel Alain Doidic, Westlake Village, CA (US); Théo Gaërel, Essonne (FR)

(72) Inventors: Michel Alain Doidic, Westlake Village, CA (US); Théo Gaërel, Essonne (FR)

( * ) Notice: Subject to any disclaimer, the term of this patent is extended or adjusted under 35 U.S.C. 154(b) by 0 days.

(21) Appl. No.: 17/078,381

(22) Filed: Oct. 23, 2020

(65) Prior Publication Data

US 2021/0134038 A1    May 6, 2021

Related U.S. Application Data

(60) Provisional application No. 62/927,855, filed on Oct. 30, 2019.

(51) Int. Cl.
*G06T 13/00* (2011.01)
*H04N 9/31* (2006.01)
*F21V 8/00* (2006.01)

(52) U.S. Cl.
CPC ............ *G06T 13/00* (2013.01); *G02B 6/0001* (2013.01); *H04N 9/3141* (2013.01)

(58) Field of Classification Search
CPC ..... G06T 13/00; G02B 6/0001; H04N 9/3141
See application file for complete search history.

(56) References Cited

U.S. PATENT DOCUMENTS 6,607,275 B1 * 8/2003 Cimini .................... G09F 19/18
353/28
7,164,424 B2 * 1/2007 Liang ...................... G06T 13/60
345/473

FOREIGN PATENT DOCUMENTS

CN         101285731 A   * 10/2008  ............. G01B 11/22
CN         209 804 031 U * 12/2019  ............... G09B 9/00

* cited by examiner

*Primary Examiner* — Maurice L. McDowell, Jr.
*Assistant Examiner* — Donna J. Ricks
(74) *Attorney, Agent, or Firm* — Kelly & Kelley, LLP

(57) ABSTRACT

A system and method that provides a realistic visual dynamic simulation of water surface behavior within model scenery includes the positioning of a screen in an area of the model scenery representing or designated for a water feature. Dynamic water surface images are displayed on the screen. An optical guide may be embedded in the images for guiding a self-propelled object moving on or above the simulated water displayed on the screen.

20 Claims, 3 Drawing Sheets

SIMULATED DYNAMIC WATER SURFACE FOR MODEL SCENERY

RELATED APPLICATIONS

This application claims the benefit of U.S. Provisional Application No. 62/927,855, filed on Oct. 30, 2019.

BACKGROUND OF THE INVENTION

The present invention generally relates to model scenery, such as scaled model scenery. More particularly, the present invention is related to a simulated dynamic water surface for such model scenery, which may include means for guiding physical bodies across it.

Model scenery consists of creating miniature representations or models of larger subjects. The model and scenery may be "to scale" or "scaled" wherein there is a relationship between the size of the model and the size of the object the model represents. The most familiar scale models represent the physical appearance of an object in miniature. Scale models are used in many fields, including engineering, architecture, film making, military command, salesmanship, and hobby model building.

Scale model layout sceneries often include representations of water ways, lakes or ocean shores. Furthermore, boats, static or moving, are often placed on these bodies of water representations.

Two methods are presently being used to implement these model water scenes. One of them uses a coating, such as paint, varnish or resins, laid over a flat surface to simulate the appearance of water. This method can only represent a static state of the simulated water and cannot show animated waves or wakes. A second method uses real water in a basin upon which a model boat can be floating and possibly guided by a variety of means. However, because water's physical properties such as mass and viscosity remains constant regardless of the container size, such bodies of water in a scaled down model do not produce waves or wakes resembling the intended full scale behavior.

Accordingly, there is a continuing need for a simulated dynamic water surface for model scenery which can show animated waves, wakes, and the like. What is also needed is a means for guiding physical bodies across the simulated water surface. The present invention fulfills these needs and provides other related advantages.

SUMMARY OF THE INVENTION

The invention presented herein allows a realistic visual dynamic simulation of water surface behavior within a model scenery along with the waves and wakes resulting from the water interaction with its surrounding and objects moving on its surface. Furthermore, it also provides an integrated means to guide a self-propelled model body object along a path upon the surface of the simulated water.

In accordance with the invention comprising a method for simulating a dynamic water surface for model scenery, a screen is positioned in an area of a model scenery representing or designated for a water feature. Dynamic water surface images, which may comprise video images of moving water, waves and/or wakes, are displayed on the screen.

The screen may comprise an electronic display screen. A video signal representing the water surface is provided to the electronic display screen. Alternatively, the water surface images may be projected onto the screen, such as projecting video onto the screen.

An optical guide may be embedded into the video images that guides a self-propelled object moving on or above the screen. The optical guide may comprise a contrasting light or color pattern that is moved across the screen. The self-propelled object may comprise an optical guide detector operably coupled to a propulsion mechanism. The optical guide detector may comprise at least one light sensor. The self-propelled object moves in response to the movement of the optical guide.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
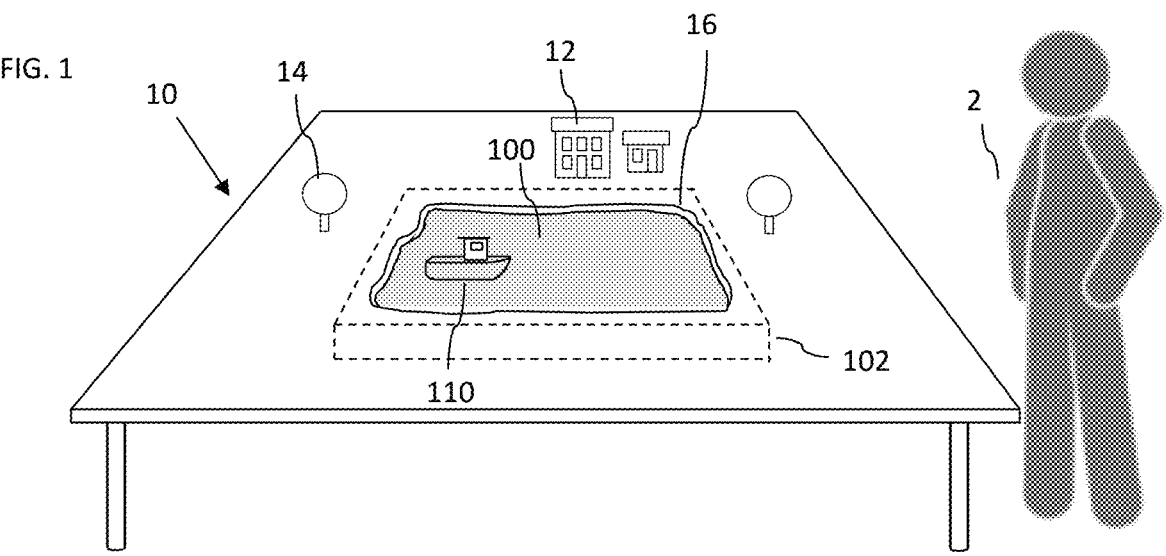
FIG. 1 is a perspective view of a model scenery incorporating the present invention.

As shown in the drawings, for purposes of illustration, the present invention is directed to a system and method for simulating a dynamic water surface within a model scenery, such as in an area of the model scenery representing or designated for a water feature. In accordance with the invention, the water surface is dynamic and may simulate water interaction with its surroundings and/or objects moving on its surface.

Figure 2:
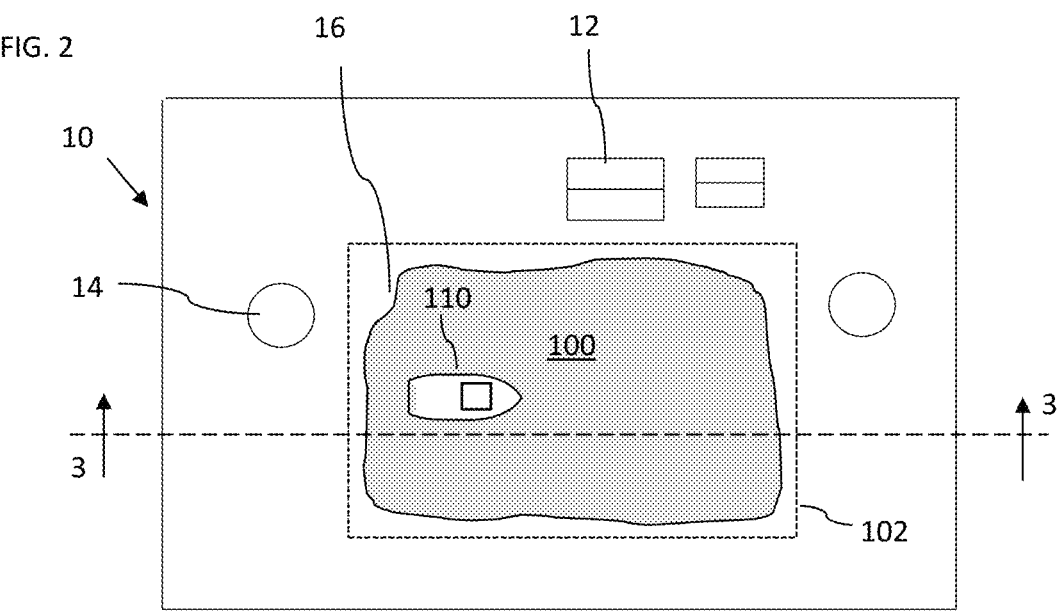
FIG. 2 is a top view of FIG. 1.

With reference now to FIGS. 1 and 2, a person 2 is shown adjacent to an exemplary model scenery 10. In the illustrated example, the model scenery 10 includes buildings 12, trees 14, and an area 16 representing or designated for a water feature. It will be appreciated by those skilled in the art that the model scenery can represent a wide variety of scenes and layouts, including for model railroads, architectural layouts, displays, dioramas, military models, cities, etc. The model scenery may be produced to scale, wherein the various components thereof are created at a consistent relative small scale so as to appear realistic, although miniature. The model scenery could represent actual scenes, including actual cities or other locations and the like, or fictional scenes. The incorporation of the present invention is particularly useful when the model scenery includes an area 16 which represents or designates a water feature, which may comprise a pond, lake, ocean, bay, swimming pool, river, or the like. Such a water feature area may be generally horizontally disposed.

Figure 3:
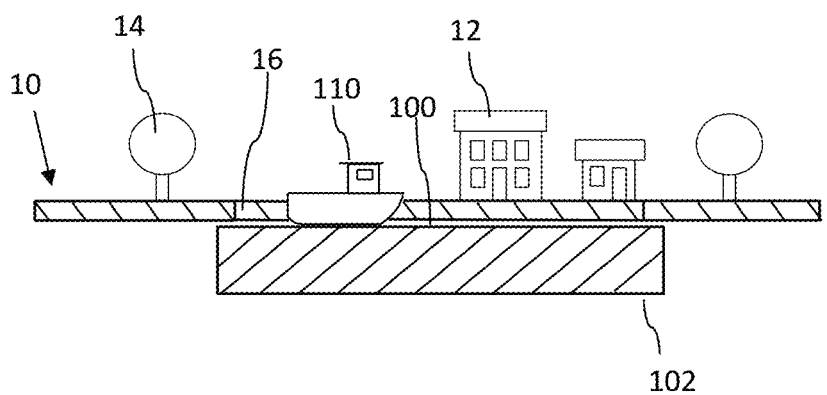
FIG. 3 is a cross-sectional view of FIG. 2 taken generally along line 3-3, illustrating placement of an electronic display screen, in accordance with the present invention.

With reference to FIGS. 1-3, in accordance with the present invention, a screen 100 is positioned in the area of the model scenery representing or designated for the water feature. Dynamic water surface images are displayed on the screen 100. Such water surface images may comprise dynamic images, such as video images, of moving water, waves, wakes, or the like. Such images could represent water of a lake, river, ocean shoreline, etc.

As will be more fully discussed herein, objects can be placed on or above the screen 100 and the water surface images could be provided that show what would be the interaction between the water and the object on or above the screen 100. Underwater objects, such as plant life, animals, lower surface boulders, coral or the like could also be displayed on the screen 100 in order to provide a more realistic experience for the user 2 viewing the model scene 10.

With continuing reference to FIGS. 1-3, the screen 100 may comprise an electronic display screen of an electronic device 102. Such an electronic device could be, for example, a computer screen, a tablet, an iPad, an electronic or digital television or the like. The screen 100 could be part of the electronic device 102, or be operably coupled to an electronic device which would provide a video signal representing the water surface and other features to the electronic display screen.

The display screen 100 is properly mounted so as to present its display surface on the proper plane, such as the horizontal plane, on which the images, typically in the form of a video feed, is viewable from the point of view of the observer 2. The surrounding area can be framed by the model scenery to reproduce the intended full-scale scene prototype. The edge of the scenery defining the area representing or designated for the water feature 16 can overlap the screen 100 and/or edges of the electronic device 102 so as to hide the rectilinear nature of the screen 100 or devices 102 periphery and create a more organic appearance.

Figure 4:
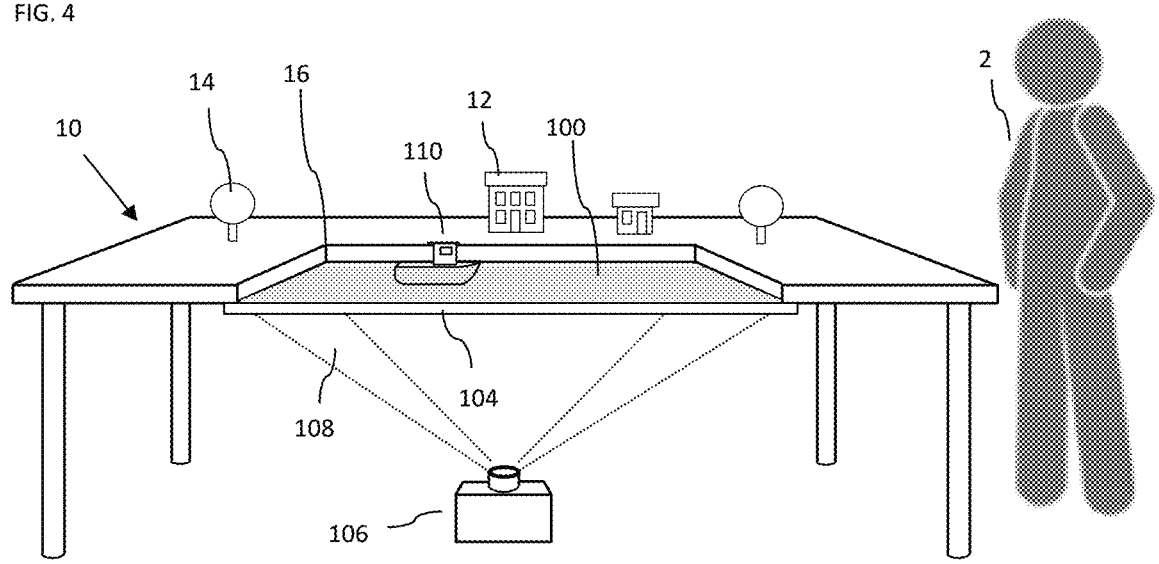
FIG. 4 is a partially sectioned perspective view illustrating a screen and video projector incorporated into model scenery, in accordance with the present invention.

With reference now to FIG. 4, in an alternative form, the display screen comprises a screen 104, such as a transparent or semi-transparent screen, upon which a projector 106 projects the images 108 onto the screen 104. This may be done by means of rear-view projection wherein the video program comprising the water surface images are projected onto a rear face of the screen 104 such that the images are viewable from the point of view of the observer 2 from a front surface of the screen 104.

As mentioned above, the video signal providing the images represents a water body surface, such as, but not limited to, a lake, river, ocean shoreline, swimming pool, etc., which is fed to a video display device and then displayed or projected onto the screen 100 or 104. Such images appear to the observer 2 as a moving picture of a natural water surface on the display surface or screen. The images can either be of a video recording of a real water surface appropriately scaled to match the scale of the modeled scenery, or an artificially-generated version of such a surface through the use of video processing applications. The video signal and images can either be pre-recorded and played back from a video storage device, or can be generated in real time by a computer application.

As shown in FIGS. 1-4, one or more objects 110 may be placed on or above the screen 100 surface. Preferably, such objects are scaled to the size of the model scenery 10. Such objects may be static or movable, such as being self-propelled. This can provide additional realism or interest to the entirety of the model scenery 10. In accordance with the present invention, the object 110 is self-propelled and the movement of the object 110 may be controlled. The object 110 is a boat in the drawings for purposes of illustration, but it will be appreciated that the object could comprise other objects, such as other vehicles, animals, etc.

Figure 5:
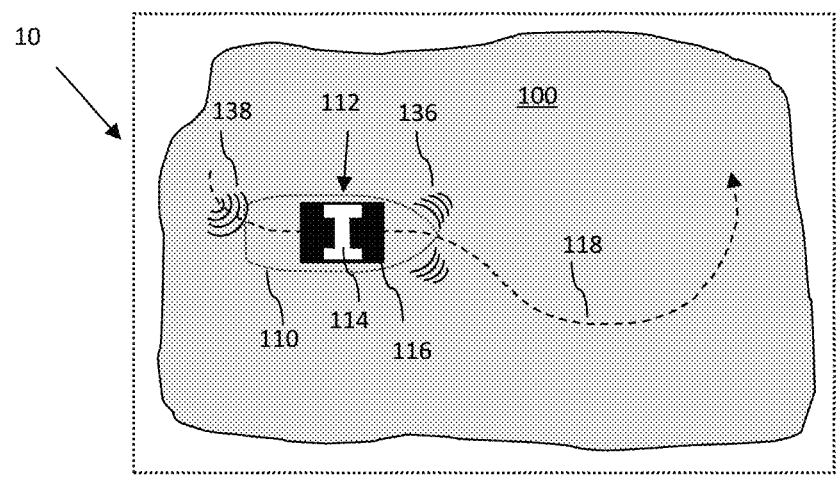
FIG. 5 is a diagrammatic top view of the invention illustrating an optical guide and a self-propelled object used in accordance with the present invention.
Figure 6:
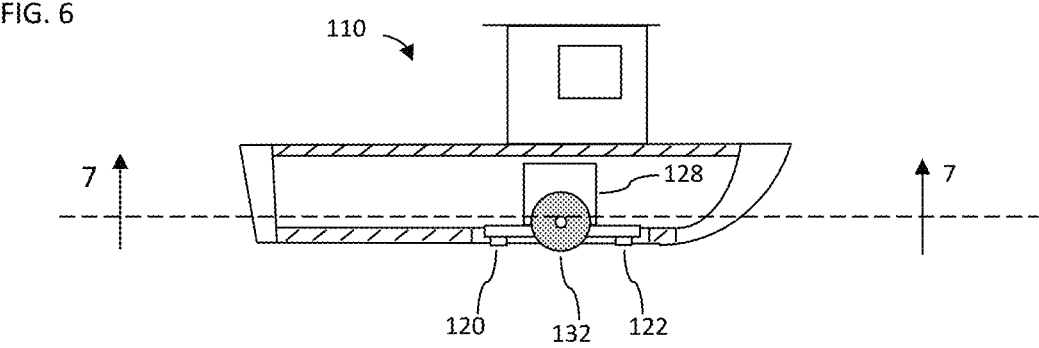
FIG. 6 is a partially sectioned side view of a self-propelled object in the form of a boat which may be used in connection with the invention.
Figure 7:
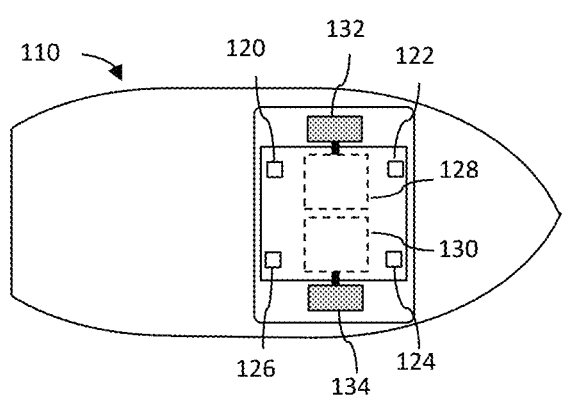
FIG. 7 is a cross-sectional view taken generally along line 7-7 of FIG. 6, illustrating optical guide detectors and a propulsion mechanism of the object.

With reference now to FIGS. 5-7, in accordance with the present invention, an optical guide 112 is embedded into the video images an displayed on the display screen 100. The optical guide 112 may be comprised of an optical guide pattern, such as contrasting colors or areas which are brighter and darker than other areas, such as having a bright white area 114 over or surrounded by a black area 116. As part of the video program, this optical guide pattern 112 can be animated to move along a predetermined path 118. Alternatively, the invention contemplates that the path 118 may be controlled in real time by a user. This could be done by inputting movement signals into an electronic device, such as by a joy stick or the like, which then would move the optical guide pattern 112 along a path across the screen 100.

The self-propelled object 110 comprises an optical guide detector operably coupled to a propulsion mechanism, such that the self-propelled object 110 moves in response to the movement of the optical guide 112. In the illustrated embodiment, as shown in FIGS. 6 and 7, the self-propelled object 110 has four light detectors 120-126 in spaced relation to one another and corresponding to the pattern of the optical guide 112. The light detectors 120-126 are operably coupled to electric motors 128 and 130, which in turn are coupled to wheels 132 and 134. In response to the light detectors 120-126, detecting the varying contrasts or light of the optical guide 112, the motors 128 and 130 are actuated so as to turn wheels 132 and 134 in either a forward or reverse direction. It will be appreciated that the one or more optical guide detectors and propulsion mechanism may vary in number, configuration, or even component, so long as the optical guide 112 is detected and results in the proper or desired movement of the object 110 in response to the optical guide 112 being moved across the display screen.

Figure 8:
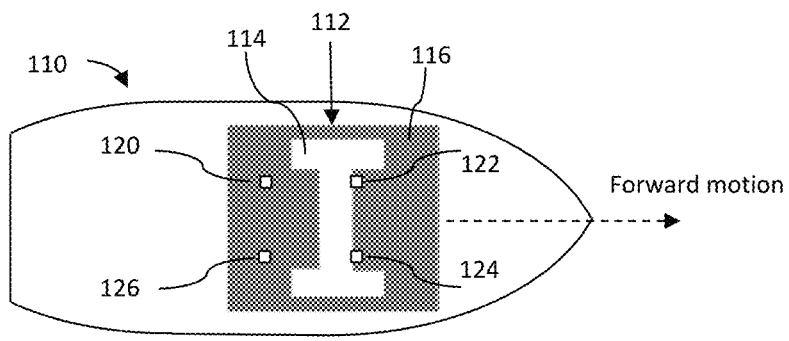
FIG. 8 is a diagrammatic view illustrating an optical guide in relation to the object's optical guide detectors, so as to propel the object forward.
Figure 9:
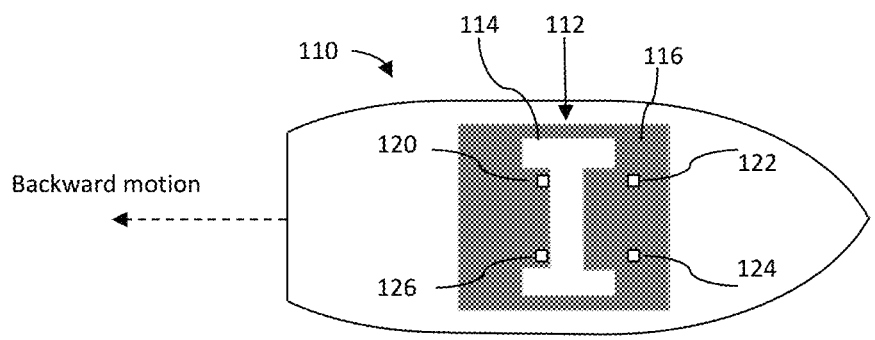
FIG. 9 is a diagrammatic view similar to FIG. 8, but illustrating the optical guide positioned with respect to the optical guide detectors so as to move the object in a backward motion.

Typically, the self-propelled object 110 will have the light detection system of the plurality of optical guide detectors 122-126 and propulsion mechanism, such as the motors 128 and 130 and wheels 132, and 134, at a lower portion or bottom surface of the object 110 so as to detect the contrasting pattern 114 and 116 of the optical guide 112, and thus continuously reposition itself over the optical guide and pattern 112 as it moves. For example, as illustrated in FIGS. 8 and 9, as the white or lighter portion 114 of the pattern of the optical guide 112 is detected by the forward light detectors 122 and 124, the object 110 is propelled forward, such as by means of the motors 128 and 130 rotating the wheels 132 and 134 in a direction so as to move the object 110 forward. However, as illustrated in FIG. 9, if the optical guide 112 changes position such that the white or lighter portion of the pattern 114 of the optical guide 112 is detected by the detectors 120 and 126, the wheels are rotated in an opposite direction, causing a backward motion of the object 110.

It will be appreciated that the optical guide 112 pattern is preferably sized so as to fit within the outline of the object 110 so as not to be seen by the observer 2. Moreover, the pattern itself can vary, as well as the number and placement of the optical guide detectors, motors, wheels, or other components of the propulsion mechanism. Sensing of light or a lighter area of the pattern by the optical guide detectors will determine the appropriate movement of the propulsion mechanism. This can be by means of a control circuit or the like which couples the light detectors to the motors or other propulsion mechanism components. As the white or light portions of the pattern of the optical guide 112 is detected by the various optical guide detectors, the object 110 is moved so as to keep the object aligned with the optical guide 112 at all times, and causes the object 110 to duplicate the video light pattern's motion. The shape and size of the optical guide pattern guarantees that the opposing light sensors cannot be activated at the same time, and thus the object 110 moves in a controlled forward or backward motion.

Consequently, as illustrated in FIG. 5, the self-propelled object 110 follows the path of the optical guide pattern 118 and remains over the optical guide pattern 112 at all times, keeping it hidden from the viewer, as shown by the moving object's outline. Additionally, the waves 136 and wake 138 patterns, similar to that generated in the world by an object moving on the water surface, may be included in the video signal images to precede and follow the video guide pattern 112 and track its path 118, resulting in the illusion that the waves and wakes are caused by the object's motion across the simulated water surface. This provides additional realism and interest to the observer 2 of the model scenery 10.

Although several embodiments have been described in detail for purposes of illustration, various modifications may be made without departing from the scope and spirit of the invention. Accordingly, the invention is not to be limited, except as by the appended claims.

What is claimed is:

1. A method for simulating a dynamic water surface for model scenery, comprising the steps of:
    positioning a screen in an area representing or designated for a water feature of a model scenery comprising a miniature representation or model of larger subjects;
    displaying on the screen dynamic water surface images comprising video images of moving water, waves and/or wakes; and
    embedding an optical guide into the video images that guides a self-propelled object moving on or above the screen;
    wherein the optical guide comprises a contrasting light or color pattern that is moved across the screen.

2. A method for simulating a dynamic water surface for model scenery,
    comprising the steps of:
    positioning an electronic display screen in an area representing or designated for a water feature of a model scenery comprising a miniature representation or model of larger subjects;
    providing a video signal representing dynamic water surface images, including moving water, waves and/or wakes scaled to the model scenery;
    embedding an optical guide into the video signal;
    displaying the video of the water surface images and the optical guide on the screen; and
    providing a self-propelled object having an optical guide detector operably coupled to a propulsion mechanism such that the self-propelled object moves on or above the screen in response to movement of the optical guide.

3. The method of claim 2, wherein the optical guide detector comprises at least one light sensor.

4. The method of claim 2, wherein the optical guide comprises a contrasting light or color pattern that is moved across the screen.

5. The method of claim 2, wherein the water surface images comprise images of a lake, ocean, shore, bay, pond, river, pool or waterway.

6. A method for simulating a dynamic water surface for model scenery, comprising the steps of:
    positioning a screen in an area representing or designated for a water feature of a model scenery comprising a miniature representation or model of larger subjects;
    projecting a video of dynamic water surface images, including moving water, waves and/or wakes scaled to the model scenery, onto the screen;
    embedding an optical guide into the video images; and
    providing a self-propelled object having an optical guide detector operably coupled to a propulsion mechanism such that the self-propelled object moves on or above the screen in response to movement of the optical guide.

7. The method of claim 6, wherein the optical guide detector comprises at least one light sensor.

8. The method of claim 6, wherein the optical guide comprises a contrasting light or color pattern that is moved across the screen.

9. The method of claim 6, wherein the water surface images comprise images of a lake, ocean, shore, bay, pond, river, pool or waterway.

10. A method for simulating a dynamic water surface for model scenery, comprising the steps of:
    positioning a screen in an area of a model scenery representing or designated for a water feature;
    displaying on the screen dynamic water surface images comprising video images of moving water, waves and/or wakes; and
    embedding an optical guide into the video images that guides a self-propelled object moving on or above the screen.

11. The method of claim 1, wherein the screen comprises an electronic display screen.

12. The method of claim 11, including the step of providing a video signal representing the water surface to the electronic display screen.

13. The method of claim 10, including the step of projecting the water surface images onto the screen.

14. The method of claim 13, wherein the water surface images comprise a video projected onto the screen.

15. The method of claim 10, wherein the self-propelled object comprises an optical guide detector operably coupled to a propulsion mechanism.

16. The method of claim 15, wherein the optical guide detector comprises at least one light sensor.

17. The method of claim 10, wherein the optical guide comprises a contrasting light or color pattern that is moved across the screen.

18. The method of claim 17, wherein the self-propelled object moves in response to the movement of the optical guide.

19. The method of claim 10, wherein the water images are scaled to the model scenery.

20. The method of claim 10, wherein the water surface images comprise images of a lake, ocean, shore, bay, pond, river, pool or waterway.

* * * * *